(12) United States Patent
Chang et al.

(10) Patent No.: US 7,873,029 B2
(45) Date of Patent: Jan. 18, 2011

(54) SYSTEM AND METHOD OF PROVIDING MULTIMEDIA COMMUNICATION SERVICES

(75) Inventors: Hisao M. Chang, Cedar Park, TX (US); Javier B. Arellano, Austin, TX (US); Steven William Frew, Pflugerville, TX (US); Sreenivasa Gorti, Austin, TX (US); Bach Ngoc Hoang, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 254 days.

(21) Appl. No.: 11/368,815

(22) Filed: Mar. 6, 2006

(65) Prior Publication Data

US 2007/0206753 A1  Sep. 6, 2007

(51) Int. Cl.
  *H04L 12/66*  (2006.01)
(52) U.S. Cl. .................. 370/352; 370/201; 370/254; 370/389; 370/312; 370/329; 455/461; 455/566; 379/211.02; 379/142.01; 379/188
(58) Field of Classification Search ............ 379/201.01, 379/201.07, 201.08, 230, 221, 266.01, 88.22; 455/461, 456.6; 709/230; 370/352–356
  See application file for complete search history.

(56) References Cited

U.S. PATENT DOCUMENTS

| | | | | |
|---|---|---|---|---|
| 5,357,564 A * | 10/1994 | Gupta et al. | ................. | 379/188 |
| 6,341,228 B1 * | 1/2002 | Hubbe et al. | ................. | 455/566 |
| 6,687,341 B1 | 2/2004 | Koch et al. | | |
| 6,745,244 B1 | 6/2004 | Cosgriff et al. | | |
| 2002/0137129 A1 | 9/2002 | Barnes et al. | | |
| 2003/0048891 A1 * | 3/2003 | Broussard et al. | ....... | 379/201.03 |
| 2003/0156700 A1 * | 8/2003 | Brown et al. | ........... | 379/210.02 |
| 2003/0215078 A1 * | 11/2003 | Brahm et al. | .......... | 379/211.02 |
| 2003/0229023 A1 | 12/2003 | Oliner et al. | | |
| 2005/0053216 A1 * | 3/2005 | Spencer et al. | ......... | 379/211.01 |
| 2005/0136949 A1 * | 6/2005 | Barnes, Jr. | ................... | 455/461 |
| 2006/0023695 A1 * | 2/2006 | Yarlagadda et al. | ......... | 370/352 |
| 2006/0153357 A1 * | 7/2006 | Acharya et al. | ........ | 379/266.01 |
| 2007/0047698 A1 * | 3/2007 | Kafka | ..................... | 379/88.22 |
| 2007/0168537 A1 * | 7/2007 | Misra et al. | ................. | 709/230 |
| 2009/0089435 A1 * | 4/2009 | Terrill et al. | ................ | 709/227 |

OTHER PUBLICATIONS

International Search Report for International Application No. PCT/US07/05543, mailed on Sep. 5, 2008.
Written Opinion of International Searching Authority for PCT/US07/05543, mailed on Sep. 5, 2008.

* cited by examiner

*Primary Examiner*—Curtis Kuntz
*Assistant Examiner*—Phung-Hoang J Nguyen
(74) *Attorney, Agent, or Firm*—Toler Law Group

(57) ABSTRACT

A system and method of providing multimedia communication services is disclosed. In a particular embodiment, the method includes receiving contextual information including a subscriber identification associated with a wireline communication device at an intelligent service switch (ISS) of an integrated wireline-wireless (IWW) network from a network edge device, where the network edge device has detected a service request at the wireline communication device. The method also includes determining at least one multimedia communication service based on the contextual information and at least one service filter associated with the subscriber identification.

30 Claims, 7 Drawing Sheets

SYSTEM AND METHOD OF PROVIDING MULTIMEDIA COMMUNICATION SERVICES

FIELD OF THE DISCLOSURE

The present disclosure is generally related to providing multimedia communication services.

BACKGROUND

Electronic communication services are no longer limited to talking with other individuals over a telephone connection. Callers can use wireline and wireless telephone networks, such as public switched telephone networks (PSTN) and cellular networks, to contextual information services. For example, PSTN-based network service providers can provide a variety of voice services to customers based on which telephone line they are calling from or which telephone number they are calling. Mobile service providers can provide similar services based on wireless terminals that customers use to access the services.

Customers of Internet Protocol (IP) based data networks can receive communication services that are more robust than those available to PSTN and cellular customers. Consequently, these customers typically demand multimedia services. Telephone service providers cannot exclusively employ IP-based platforms, because their PSTN customers, for example, may be unable to benefit from certain services. Telephone service providers cannot converge PSTN, wireless, and IP networks, because the cost of maintaining three different service switching systems for a single customer base is high. Hence, there is a need to integrate wireline, wireless, and IP networks in order to customize services.

DETAILED DESCRIPTION OF THE DRAWINGS

Figure 1:
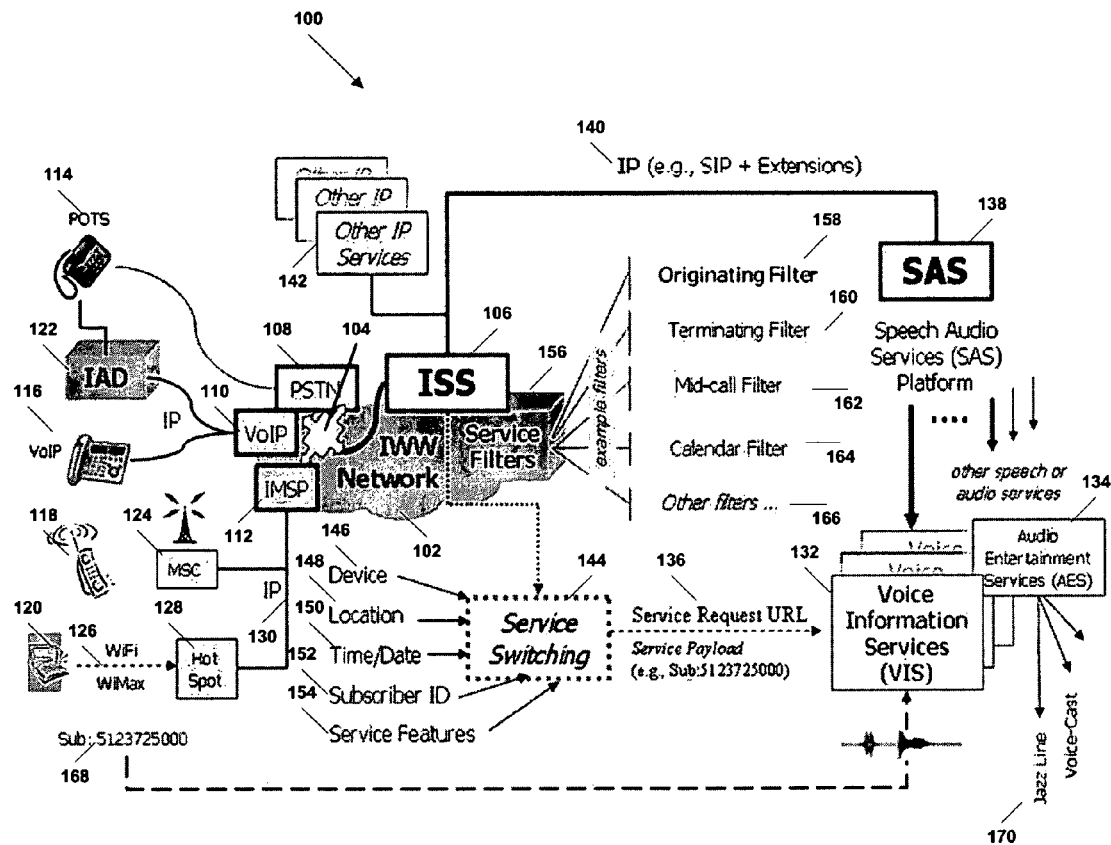
FIG. 1 is a block diagram illustrating a first particular embodiment of a system to provide multimedia communication services.

A system to provide multimedia communication services is disclosed and includes an intelligent service switch configured to receive contextual information related to a wireline communication device from a network edge device of an integrated wireline-wireless (IWW) network. The network edge device includes an interface to detect a service request at the wireline communication device. The contextual information includes a subscriber identification associated with the wireline communication device. The intelligent service switch includes at least one service filter associated with the subscriber identification and is configured to determine at least one multimedia communication service based on the contextual information and based on the at least one service filter.

A system to provide multimedia communication services is disclosed and includes a network edge device of an integrated wireline-wireless (IWW) network, the network edge device configured to detect a service request from a wireline communication device coupled to the IWW network. The network edge device is configured to determine contextual information related to the wireline communication device, where the contextual information includes a subscriber identification associated with the wireline communication device. The network edge device is configured to transmit the contextual information to an intelligent service switch. The intelligent service switch determines at least one multimedia communication service based on the contextual information and based on at least one service filter associated with the subscriber identification.

In another particular embodiment, a method of providing multimedia communication services is disclosed and includes receiving contextual information including a subscriber identification associated with a wireline communication device at an intelligent service switch (ISS) of an integrated wireline-wireless (IWW) network from a network edge device, where the network edge device has detected a service request at the wireline communication device. The method also includes determining at least one multimedia communication service based on the contextual information and based on at least one service filter associated with the subscriber identification.

In another particular embodiment, a method of providing multimedia communication services is disclosed and includes detecting a service request of a wireline communication device. The method also includes determining contextual information related to the service request, where the contextual information includes a subscriber identification associated with the wireline communication device. The method also includes transmitting the contextual information to an intelligent service switch, where the intelligent service switch determines at least one multimedia communication service based on the contextual information and based on at least one service filter associated with the subscriber identification.

In another particular embodiment, a computer program embedded in a computer-readable medium is disclosed and includes instructions to detect a service request from a communication device coupled to an integrated wireline-wireless (IWW) network. The computer program also includes instructions to determine contextual information related to the communication device, where the contextual information includes a subscriber identification associated with the communication device and a type of the communication device. The computer program also includes instructions to transmit the contextual information to an intelligent service switch, the intelligent service switch determining at least one multimedia communication service based on the contextual information and based on at least one service filter associated with the subscriber identification.

In another particular embodiment, a computer program embedded in a computer-readable medium is disclosed and includes instructions to communicate with a network edge device of an integrated wireline-wireless (IWW) network to receive contextual information related to a communication device, where the network edge device has detected a service request at the communication device. The contextual information includes a subscriber identification associated with the communication device and a type of the communication device. The computer program also includes instructions to determine at least one multimedia communication service based on the contextual information and based on the at least one service filter.

Referring to FIG. 1, a first particular embodiment of a system to provide multimedia communication services is illustrated and designated generally at 100. The system 100 includes an integrated wireline-wireless (IWW) network 102 having a router 104 that communicates with an intelligent services switch (ISS) 106. The router 104 can communicate with a variety of network edge points or nodes, such as a public-switched telephone network (PSTN) edge device 108, a Voice-over Internet Protocol (VoIP) network edge device 110, an Internet Protocol Multimedia Service Point (IMSP) 112, or any combination thereof.

Customer premises equipment (CPE) 114-120 can communicate with the IWW network 102 via the network edge devices 108-112. For example, one or more wireline devices, such as a Plain Old Telephone System (POTS) phone 114 or a VoIP phone 116, can communicate with the IWW network 102. In a particular embodiment, the POTS phone 114 can communicate with the IWW network 102 via the PSTN edge device 108. In another particular embodiment, the POTS phone 114 can communicate with the IWW network 102 via an intelligent access device (IAD) 122 that enables the POTS phone 114 to transmit and receive data via the VoIP network edge device 110.

In a particular embodiment, one or more wireless devices, such as a wireless phone 118, a wireless computing device 120, or any combination thereof, can communicate with the IWW network 102. In an illustrative embodiment, the wireless phone 118, such as a cellular phone or personal data assistant (PDA) phone, can communicate with the IWW network 102 via a mobile switching center (MSC) 124. The MSC 124 can include, for example, a wireless access point that communicates with the IMSP 112 via an IP data network 130. Additionally, the wireless computing device 120, such as a laptop computing device, can communicate with the IWW network 102 via a wireless network 126, such as a wireless fidelity (Wi-Fi) network, worldwide interoperability for microwave access (Wi-Max) network, wireless metropolitan access network, 802.1x network, or any combination thereof, at a 'hot spot' 128 that enables the wireless computing device 120 to communicate with the IP data network 130.

The ISS 106 can connect the CPE devices 114-120 with a variety of voice information services 132 and other IP services 142. For example, the ISS 106 can connect the CPE devices 114-120 with voice information services 132, such as audio entertainment services 134 and other speech and audio services via service switching 144 that uses service request uniform resource locators (service request URLs) 136. In an illustrative embodiment, CPE devices communicating via the VoIP network edge device 110 can communicate with the voice information services 132 via a speech audio services (SAS) platform 138 associated with one or more IP extensions 140.

In an illustrative embodiment, the voice information services 132 can include audio entertainment content, news content, weather content, traffic content, securities market content, sports content, financial content, local business location content, local event schedule content, network address book content, calendar content, appointment content, map content, call log content, or any combination thereof.

In a particular embodiment, the ISS 106 can provide service switching 144 based on contextual information 146-154 associated with a service request. Contextual information can include, for example, the type 146 of a device that requests a multimedia communication service; the location 148 of the device; a time 150 of the request, which may include a time of day, a range of times of day, a day of the week, a date, or any combination thereof; a subscriber identification (ID) 152 associated with the device; and features 154 of the requested multimedia communication service.

Further, the ISS 106 can provide service switching 144 based on one or more service filters 156. The service filters 156 can include an originating filter 158 that relates services to the device requesting the multimedia communication service; a terminating filter 160 that relates multimedia communication services to a destination telephone number, extension, service code, or any combination thereof entered at the device requesting the service; a mid-call filter 162 that relates multimedia communication services to requests captured during an active session, such as when a user is accessing voice mail; a calendar filter 164 that relates services to a calendar date of a request, such as appointments associated with a user of the device requesting the multimedia communication service; any other filter(s) 166 suitable to determine, customize, or determine and customize, multimedia communication services that are provided to a CPE device 114-120.

The IWW network 102 detects a service request of a wireline communication device, such as the POTS phone 114 or VoIP phone 116. In an illustrative embodiment, the PSTN network edge device 108 or VoIP edge device 110 can detect an off-hook condition of the wireline communication device, a code entered at the wireline communication device, a telephone number dialed at the wireline communication device, or any combination thereof. Upon detecting the service request, the network edge device determines contextual information related to the service request. The contextual information includes a subscriber ID 152 associated with the wireline communication device, which the network edge device can retrieve from a data store within its memory or from an external data store coupled to the network edge device. In a particular embodiment, the contextual information can also include any other portion of the contextual information 146-154. The network edge device transmits the contextual information to the ISS 106, and the ISS 106 determines one or more multimedia communication services that are to be provided at the wireline communication device. In a particular embodiment, the ISS 106 can determine such services based on the contextual information, one or more of the service filters 156, or any combination thereof.

For example, a caller can place the POTS phone 114 off-hook. The VoIP network edge device 110 can detect the off-hook condition via the IAD 122 and obtain caller identification information related to the POTS phone 114. The VoIP network edge device 110 can determine a subscriber ID 152, such as a telephone number 168 of the device. The VoIP network edge device 110 can transmit the telephone number 168 to the ISS 106, and the ISS 106 can apply an originating filter 158 to determine that the POTS phone 114 is associated with a jazz line 170 of the audio entertainment services 134. The ISS 106 can connect the POTS phone 114 with the jazz line 170 via the VoIP network edge device 110, in response to the off-hook condition of the POTS phone 114. The VoIP network edge device 110 can receive the jazz music and transmit it to the POTS phone 114.

In another embodiment, the IWW network 102 can detect a service request of a wireless communication device, such as the wireless phone 118 or computing device 120. For example, the IMSP 112 can detect a dialing condition of the wireless phone 118 or a network access request from the computing device 120. Upon detecting the service request, the IMSP 112 determines contextual information related to the service request. The contextual information includes a subscriber ID 152 associated with the wireless communication device, which the IMSP 112 can retrieve from a data store within its memory or from an external data store coupled to the IMSP 112. In a particular embodiment, the contextual information can also include any other portion of the contextual information 146-154. The IMSP 112 transmits the contextual information to the ISS 106, and the ISS 106 determines one or more multimedia communication services that are to be provided at the wireless communication device. The ISS 106 can determine such services based on the contextual information, one or more of the service filters 156, or any combination thereof.

In an illustrative embodiment, a computing device 120 at a hot spot 128 can request movie information by issuing a request code to the IMSP 112. The IMSP 112 can detect the service request and determine a subscriber ID 152 associated with the computing device 120, such as an IP address. Additionally, the IMSP 112 can determined that the service request is made by a laptop computing device 120 that has screen area not provided by wireless phones or PDAs, for instance. The IMSP 112 can transmit the IP address and type of computing device to the ISS 106. The ISS 106 can apply a terminating filter 160 to determine that an audio movie information service provided by the voice information services 132 is also associated with a graphical/textual movie data service in the other IP services 142. Because the computing device 120 has available screen area to receive movie data, the ISS 106 can connect the computing device 120 with both the audio movie information service and the graphical/textual movie data service. The IMSP 112 can receive the audio movie information and graphical/textual movie data and transmit them to the computing device 120.

Figure 2:
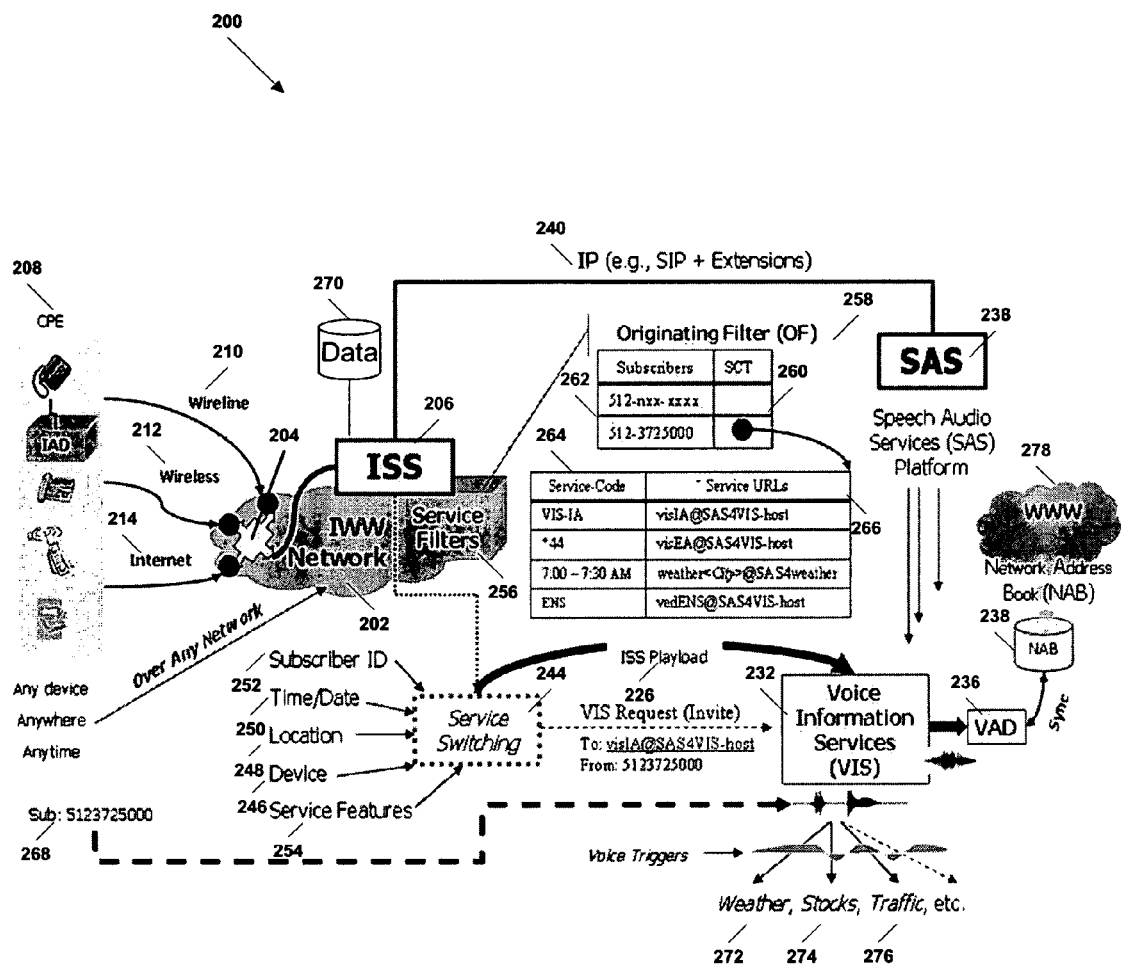
FIG. 2 is a block diagram illustrating a second particular embodiment of a system to provide multimedia communication services.

Referring to FIG. 2, a second particular embodiment of a system to provide multimedia communication services is illustrated and designated generally at 200. The system 200 includes an integrated wireline-wireless (IWW) network 202 having a router 204 that communicates with an intelligent services switch (ISS) 206. The router 204 can communicate with customer premises equipment (CPE) devices 208 over a variety of networks, including a wireline network 210, a wireless network 212, the Internet 214, or any combination thereof.

In a particular embodiment, the ISS 206 can connect the CPE devices 208 with a variety of voice information services 232. For example, the ISS 206 can connect the CPE devices 208 with a network address book system 238 via service switching 244 that uses ISS payloads 226 to request voice information services 232. In a particular embodiment, the network address book system 238 can communicate with a voice-activated dialing (VAD) system 236. In an illustrative embodiment, CPE devices 208 communicating with an IP network can communicate with the voice information services 232 via a speech audio services (SAS) platform 238 associated with one or more IP extensions 240.

In a particular embodiment, the ISS 206 can provide service switching 244 based on contextual information 246-254 associated with a service request. Contextual information can include, for example, the type 246 of a device that requests a multimedia communication service; the location 248 of the device; a time 250 of the request, which may include a time of day, a range of times of day, a day of the week, a date, or any combination thereof; a subscriber identification (ID) 252 associated with the device; and features 254 of the requested multimedia communication service.

Further, the ISS 206 can provide service switching 244 based on one or more service filters 256. The service filters 256 can include, for example, an originating filter 258 that relates multimedia communication services to the device requesting the service. In an illustrative embodiment, each service filter, such as the originating filter 258, can include one or more service filter tables 260 that relates subscriber IDs 262 to service codes 264, service uniform resource locators (URLs) 266, other suitable identifiers of multimedia communication information, or any combination thereof. The service filter tables 260 can be stored within a memory portion of the ISS 206 or at an external data store 270 coupled to the ISS 206.

The IWW network 202 detects a service request of a wireline or wireless CPE device 208. In an illustrative embodiment, the router 204 can detect an off-hook condition of the wireline communication device. Upon detecting the service request, the router 204 determines contextual information related to the service request. The contextual information includes a subscriber ID 252, such as a telephone number 268, associated with the wireline communication device, which the router 204 can retrieve from a data store within its memory or from an external data store coupled to the router 204. In a particular embodiment, the contextual information can also include any other portion of the contextual information 246-254. Further, in one embodiment, the contextual information can include a service code. The router 204 transmits the contextual information to the ISS 206, and the ISS 206 determines one or more multimedia communication services that are to be provided at the wireline communication device. In a particular embodiment, the ISS 206 can access the service filter tables 260 and determine such services by determining whether the telephone number 268, the service code, or any combination thereof, is associated with a service code 264 or other service identifier within the service filter tables 260.

For example, the telephone number 268 can be associated with a service URL 266 corresponding to the voice information services 232. The ISS 206 can connect the wireline device with the voice information services 232 via the wireline network 210. In an illustrative embodiment, the voice information services 232 can prompt a caller to speak one or more voice commands, such as 'weather,' 'stocks,' or 'traffic,' each of which correspond to one of a plurality of voice triggers 272-276 that cause the voice information services 232 to transmit corresponding audio information to the wireline device. In another embodiment, the telephone number 268 can be associated with one or more service URLs 266 that relate directly to specific information provided by the voice information services 232, such that the caller need not enter a voice command. For instance, the telephone number 268 can be associated with a service URL 266 corresponding to weather information provided by the voice information services 232, such that the caller need not enter a voice command related to the 'weather' voice trigger 272.

In a particular embodiment, the IWW network 202 can detect a service request of a wireless CPE device 208. In an illustrative embodiment, the router 204 can detect a dialing condition of a personal data assistant (PDA) phone. Upon detecting the service request, the router 204 determines contextual information related to the service request. The contextual information includes a subscriber ID 252, such as a telephone number 268, associated with the PDA phone, which the router 204 can retrieve from a data store within its memory or from an external data store coupled to the router 204. In a particular embodiment, the contextual information can also include a type of the wireless device, i.e., the PDA phone. The router 204 transmits the contextual information to the ISS 206, and the ISS 206 determines one or more multimedia communication services that are to be provided at the wireless communication device. In a particular embodiment, the ISS 206 can access the service filter tables 260 and determine such services by determining whether the telephone number 268 is associated with a service code 264 or other service identifier within the service filter tables 260.

For example, the telephone number 268 can be associated with a service URL 266 corresponding to the voice information services 232. The ISS 206 can connect the wireless device with the voice information services 232 via the wireless network 212. In an illustrative embodiment, the voice information services 232 can transmit a voice-activated dialing (VAD) prompt to a caller to speak one or more voice commands to the VAD system 236, such as a name of a contact in a network address book associated with the caller at the network address book system 238. In another embodiment, the caller can speak a command related to reviewing the contents of the network address book or of a call log associated with the caller at the network address book system 238. Additionally, the ISS 206 can connect the wireless device with a multimedia communication service that provides graphical/textual contents of the network address book via the world wide web 278, based on receiving the type of wireless device (PDA phone) with the contextual information.

Figure 3:
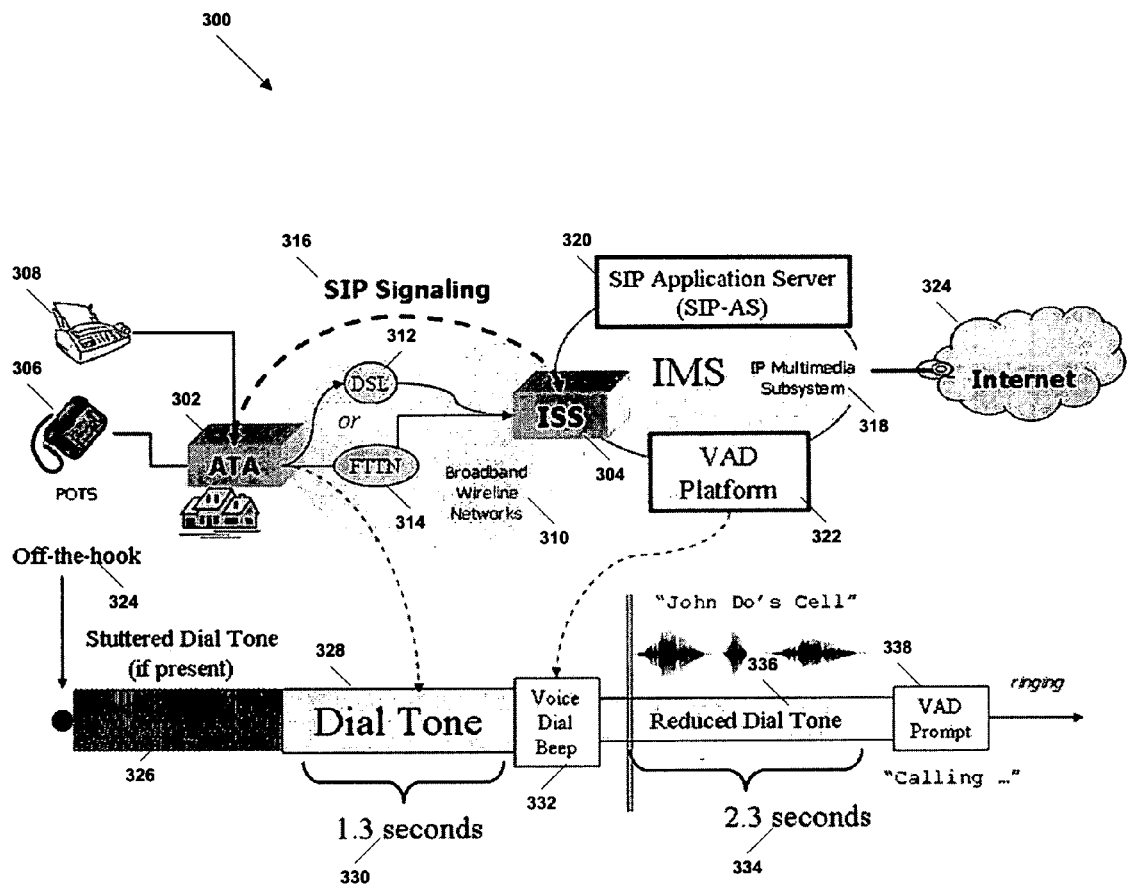
FIG. 3 is a block diagram illustrating a third particular embodiment of a system to provide multimedia communication services.

Referring to FIG. 3, a third particular embodiment of a system to provide multimedia communication services is illustrated and designated generally at 300. In The system 300 includes an analog telephone adaptor (ATA) 302 that facilitates communication between an intelligent service switch (ISS) 304 and a plain old telephone service (POTS) phone 306, a facsimile machine 308, other wireline device, or any combination thereof. The ATA 302 can communicate with the ISS 304 over one or more broadband wireline networks 310, including a digital subscriber line (DSL) network 312, a fiber-to-the-neighborhood (FTTN) network 314, or any combination thereof. In an illustrative embodiment, the ATA 302 can communicate with the ISS 304 via session initiation protocol (SIP) signaling 316.

In a particular embodiment, the ISS 304 can connect the wireline devices 306-308 with an Internet Protocol (IP) multimedia service subsystem 318. For example, the IP multimedia service subsystem 318 can include audio services, graphical/textual services, or any combination thereof, that can be delivered from one or more SIP application servers 320 to the wireline devices 306-308 via a voice activated dialing (VAD) platform 322, the Internet 324, or any combination thereof.

In an illustrative, non-limiting embodiment, a caller can place the POTS phone 306 off-hook. The ATA 302 can detect the off-hook condition and determine contextual information associated with the POTS phone 306, such as a telephone number or other subscriber identification and a type of wireline device. The ATA 302 can communicate the contextual information to the ISS 306, and the ISS 306 can determine that the POTS phone 306 is to be connected with the VAD platform 322, based on one or more service filters.

In a particular embodiment, the ATA 302 can provide a stuttered dial tone 326 at the POTS phone 322. The caller can enter a service code associated with a multimedia communication service during the stuttered dial tone 326. Alternatively, the stuttered dial tone 326 can alert the caller to voice mail messages recorded at the IP multimedia service subsystem 318. Further, the ATA 302 can provide a continuous dial tone 328 at the POTS phone 322, for example, if the ATA 302 does not provide a stuttered dial tone 326, or if the caller takes no action during the stuttered dial tone 326.

In one embodiment, the caller can dial a destination telephone number during the continuous dial tone 328. If the caller does not dial a destination telephone number within a period of time 330 after the continuous dial tone 328 begins, the VAD platform 322 can prompt the caller to speak a voice-dialing command, for instance, by providing a voice-dial beep or tone 332 at the POTS phone 306. Further, the voice-dial beep or tone 332 can be followed by a reduced-volume dial tone 336, during which the caller can speak an identifier of a contact that the caller wishes to call, such as "Jon Do's Cell." Alternatively, the caller can speak a voice command of a service, such as "Network Address Book," "Call Log," "Movies," etc. In an illustrative embodiment, after the caller speaks the identifier or service name, the VAD platform 322 can transmit a VAD prompt 338 that informs the caller that the caller's voice command is being executed, such as "Retrieving Call Log" or "Calling Jon Do's Cell," while the requested service is accessed or the POTS phone 306 is connected with a device associated with the destination telephone number.

Figure 4:
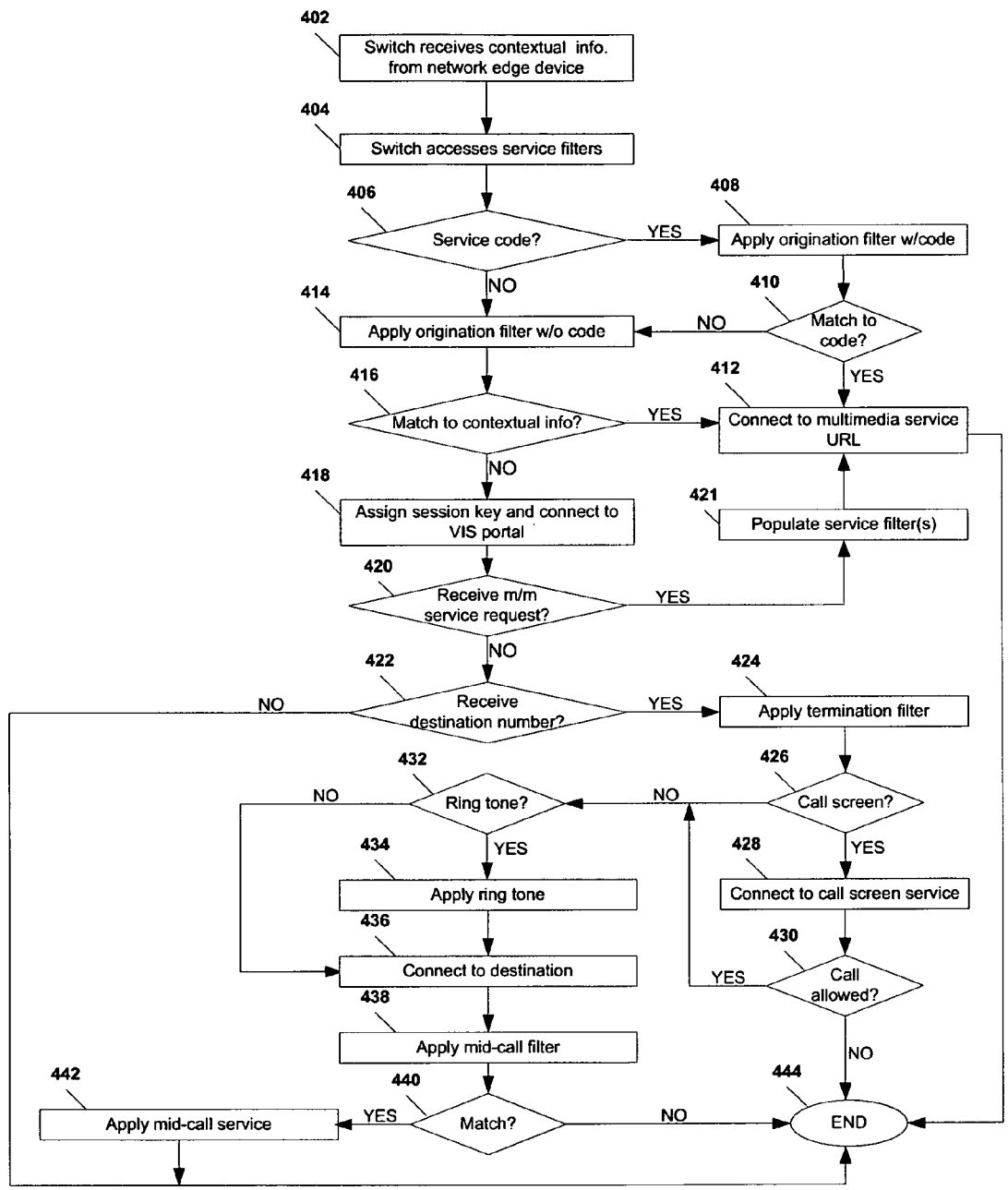
FIG. 4 is a flow diagram illustrating a first particular embodiment of a method of providing multimedia communication services.

Referring to FIG. 4, a first particular embodiment of a method to provide multimedia communication services is illustrated. At block 402, an intelligent service switch (ISS) receives contextual information related to a service request from a communication device. The contextual information can include a type of the communication device; a location of the communication device; a time of the service request, which may include a time of day, a range of times of day, a day of the week, a date, or any combination thereof; a subscriber identification (ID) associated with the communication device; a service code related to the requested multimedia communication service; or any combination thereof. In a particular embodiment, the contextual information can be collected at a network edge device that communicates with the ISS via a router of an integrated wireline-wireless network. The network edge device can include a public-switched telephone network edge device, a Voice-over Internet Protocol (VoIP) network edge device, an IP Multimedia Service Point, any other suitable network edge device to connect a communication device with the ISS, or any combination thereof.

Continuing to block 404, the switch accesses one or more service filters, such as an origination filter, a mid-call filter, a terminating filter, a calendar filter, any other suitable filter to determine a multimedia communication service to be connected with the communication device, or any combination thereof. The service filter(s) can be stored at the ISS or at a data store coupled to the ISS. In an illustrative embodiment, each service filter can include one or more service filter tables that include service filter values. For example, the service filter tables can relate contextual information to one or more service uniform resource locators (URLs).

Moving to decision step 406, the ISS determines whether a service code is included in the contextual information. If a service code is included with the contextual information, the method continues to block 408, and the ISS applies the origination service filter to determine one or more multimedia communication services associated with the service code. The method advances to decision step 410, and the ISS determines whether there is a match to the service code at the origination filter. If no match exists, the method moves to block 414. Whereas, if a match exists, the method continues to block 412, and the ISS connects the multimedia communication service to the network edge device, which can transmit content of the multimedia communication service to the communication device. The method then terminates at 444.

Returning to decision step 410, if a service code is not included with the contextual information, the method proceeds to block 414. At block 414, the ISS can apply the origination filter and determine whether one or more multimedia communication services are associated with one or more portions of the contextual information. Continuing to decision step 416, the ISS determines there is a match to the contextual information within the origination filter. If a match exists, the method moves to block 412, and the ISS connects the multimedia communication service to the network edge device, which can transmit content of the multimedia communication service to the communication device. The method then terminates at 444. For example, the ISS may determine that an audio weather information service is associated with a subscriber ID and a time of a service request between 7:00 and 9:00 a.m. If a POTS phone associated with the subscriber ID is placed off-hook at 8:00 a.m., local weather information can be transmitted to the POTS phone via the ISS.

Returning to decision step 416, if no match to the contextual information exists in the origination filter, e.g., if the origination filter has not been populated with service filter values, the method moves to block 418. At block 418, in a particular embodiment, the ISS can assign a session key to the communication device and connect the communication device to a voice information services (VIS) portal. In an illustrative embodiment, the VIS portal can include speech-enabled platform that allows a user to request a multimedia communication service. At decision step 420, the ISS determines whether a multimedia communication service has been requested via the VIS portal. In a particular embodiment, if a multimedia communication service has been requested, the method moves to block 421, and the ISS can populate one or more service filters with data relating the contextual information to the requested multimedia communication service. For example, if a caller requests weather information on a Monday morning from a POTS phone, the ISS can relate a weather information service to the POTS phone, Monday, 7-9 a.m., or any combination thereof, within an origination filter. Continuing to block 412, the ISS connects the multimedia communication service to the network edge device, which can transmit content of the multimedia communication service to the communication device. The method then terminates at 444.

Returning to decision step 420, if no multimedia communication service has been requested, the method proceeds to decision step 422, and the ISS determines whether a destination telephone number has been dialed at the communication device or requested via the VIS portal. If no destination telephone number has been dialed or requested, the method terminates at 444. Conversely, if a destination telephone number has been dialed or requested, the method proceeds to block 424, and the ISS can apply a terminating filter to determine whether a multimedia communication service is associated with the destination telephone number, such as a call screen service or a caller-specific ring tone.

Proceeding to decision step 426, the ISS determines whether a call screen service is associated with the destination telephone number. If no call screen service is associated with the destination telephone number, the method moves to decision step 432. If a call screen service is associated with the destination telephone number, the method advances to block 428, and the communication is connected with the call screen service. The method moves to decision step 430, and it is determined whether the call is allowed to connect to the destination telephone number. If the call is not allowed, the method terminates at 444. Conversely, if the call is allowed, the method proceeds to decision step 432.

Moving to decision step 432, the ISS determines whether a caller-specific ring tone is associated with the communication device. If no such ring tone is associated with the communication device, the method proceeds to block 436 and the communication device is connected with a device associated with the destination telephone number. Whereas, if a caller-specific ring tone is associated with the communication device, the method continues to block 434 and the ring tone is applied. The method then proceeds to block 436, and the communication device is connected with a device associated with the destination telephone number. The method then continues to block 438. In an illustrative embodiment, the destination device can be a telephone. In another embodiment, it can be a voice mail system.

In a particular embodiment, at block 438, the ISS can apply a mid-call filter that can associate a multimedia communication service with an action taken at the communication device during a call. For example, if the communication device is connected with a voice mail service, and the caller enters a code to return a call being reviewed, the ISS can determine whether the code matches a call return service or another multimedia communication service during the call, via the mid-call filter. At decision step 440, the ISS determines whether such a match exists. If no match exists, the method terminates at 444. On the other hand, if a match exists, the method proceeds to block 442, and a matching mid-call service is provided at the communication device. The method then terminates at 444.

Figure 5:
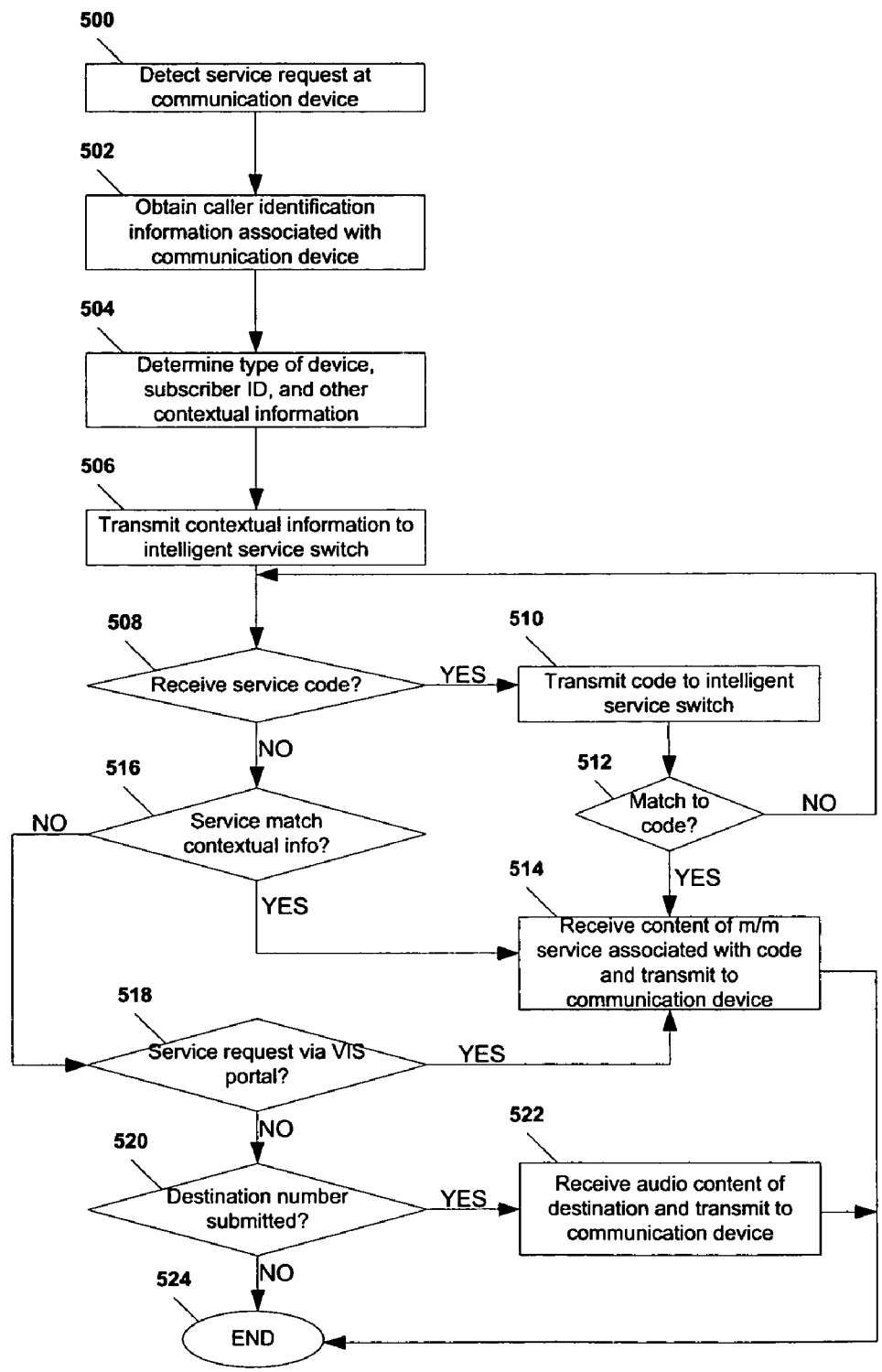
FIG. 5 is a flow diagram illustrating a second particular embodiment of a method of providing multimedia communication services.

Referring to FIG. 5, a second particular embodiment of a method to provide multimedia communication services is illustrated. At block 500, a network edge device detects a service request at a wireline or wireless communication device. Continuing to block 502, the network edge device obtains caller identification information associated with the communication device. Moving to block 504, the network edge device determines contextual information related to the communication device, such as a type of the communication device, a subscriber identification associated with the communication device, a time of the service request, or any combination thereof. In a particular embodiment, the network edge device can retrieve one or more portions of the contextual information from a data store that is coupled to the network edge device.

In an illustrative embodiment, at block 506, the network edge device can transmit the contextual information to an intelligent service switch (ISS) via a router of an integrated wireline-wireless network. Continuing to decision step 508, the network edge device can determine whether it receives a service code form the communication device. If the network edge device receives a service code, the method proceeds to block 510, and the network edge device transmits the service code to the ISS. The method continues to decision step 512, and it is determined whether there is a match to the service code at a service filter of the ISS. If no match exists, the method returns to decision step 508. Conversely, if there is a match, the method advances to block 514, and the network edge device receives the content of a matching multimedia communication service and transmits the content to the communication device. The method then terminates at 524.

Returning to decision step 508, if the network edge device does not receive a service code, the method proceeds to decision step 516. At decision step 516, it is determined whether any of the contextual information matches a multimedia communication service within a service filter of the ISS. If a match exists, the method advances to block 514, and the network edge device receives the content of a matching multimedia communication service and transmits the content to the communication device. The method then terminates at 524. Conversely, if no match exists, the method moves to decision step 518, and the network edge device determines whether a service request has been made at the communication device via a voice information services (VIS) portal.

If a service request has been made via the voice information services (VIS) portal, the method advances to block 514, and the network edge device receives the content of a matching multimedia communication service and transmits the content to the communication device. The method then terminates at 524. Alternatively, in a particular embodiment, if no request has been made, the method moves to decision step 520, and the network edge device determines whether a destination telephone number is dialed. If no destination telephone number is dialed, the method terminates at 524. On the other hand, if a destination telephone number is dialed, the method moves to block 522, and the network edge device receives audio content from a device associated with the destination telephone number is received and transmits the content to the communication device. The method then terminates at 524.

Figure 6:
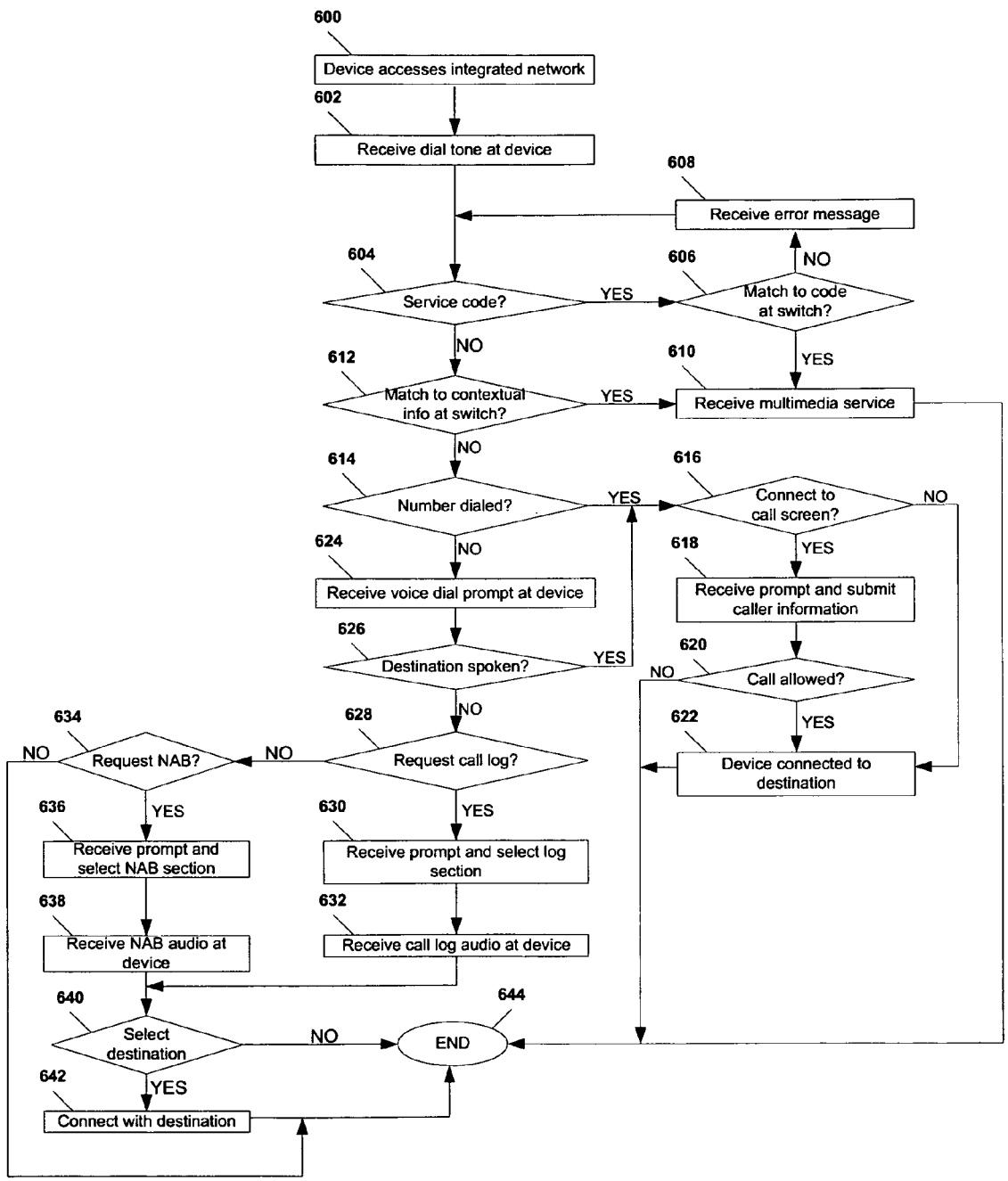
FIG. 6 is a flow diagram illustrating a particular embodiment of a method of receiving multimedia communication services.

Referring to FIG. 6, a particular illustrative embodiment of a method to receive multimedia communication services is illustrated. At block 600, a communication device accesses an integrated wireline-wireless network. Moving to block 602, the communication device receives a dial tone. In one embodiment, the dial tone can be a stuttered dial tone. In another device, the dial tone can be a continuous dial tone. Continuing to decision step 604, a caller can input a service code related to a multimedia communication service at the communication device. If the caller does not input a service code, the method proceeds to decision step 612. Conversely, if the caller inputs a service code, the method moves to decision step 606.

At decision step 606, it is determined whether the service code matches one or more multimedia communication services at a service filter of an intelligent service switch (ISS) at the integrated wireline-wireless network. If no match exists, the method moves to block 608, and an error message is received at the communication device. Alternatively, if a match exists, the method moves to block 610, and content of the multimedia communication service is received at the communication device. The method then terminates at 644.

Returning to decision step 604, if no service code is transmitted by the communication device, the method proceeds to decision step 612, and it is determined whether a match to contextual information associated with the communication device or a service request, such as an off-hook condition, matches one or more multimedia communication services at a service filter of an intelligent service switch (ISS) at the integrated wireline-wireless network. If a match exists, the method moves to block 610, and content of the multimedia communication service is received at the communication device. The method then terminates at 644. If no match exists, the method continues to decision step 614, and it is determined whether a destination telephone number is dialed at the communication device.

In a particular embodiment, if a destination telephone number is dialed at the communication device, the method can proceed to decision step 616, and it can be determined whether the communication device is connected to a call screen service associated with the destination telephone number. If the communication device is not connected to a call screen service, the method proceeds to block 622, and the communication device is connected with a device associated with the destination telephone number. Whereas, if the communication device is connected to a call screen service, the method continues to block 618. At block 618, a call screen prompt can be received at the communication device, and the caller can submit caller information. Proceeding to decision step 620, it is determined whether the call is allowed by the call screen service. If the call is not allowed, the method terminates at 644. On the other hand, if the call is allowed, the method moves to block 622, and the communication device is connected with a device associated with the destination telephone number. The method then terminates at 644.

Returning to decision step 614, in a particular embodiment, if no destination telephone number is dialed, the method can proceed to block 624, and a voice-dialing prompt can be received at the communication device. In an illustrative embodiment, the prompt can be accompanied by a reduced-volume dial tone. Continuing to decision step 626, it can be determined whether a destination telephone number is spoken at the communication device. In a particular embodiment, if a destination is spoken at the communication device, the method can move to decision step 616 and continue. Conversely, if no destination is spoken, the method advances to decision step 628, and it is determined whether a call log is requested at the communication device.

In an illustrative embodiment, if a call log is requested at the communication device, the method continues to block 630, and a prompt to submit a call log section can be received at the communication device. The call log section can be selected by the caller at the communication device using voice commands or dual tone multiplex frequency signals issued via touch tone keys or other keys at the communication device. The method continues to block 632, and audio related to the requested call log section can be received at the communication device. In a particular embodiment, the method can then move to decision step 640, and it can be determined whether a destination telephone number can be selected from the call log at the communication device. If no destination telephone number is selected, the method terminates at 644. Conversely, if a destination telephone number is selected from the call log, the communication is connected with a device associated with the destination telephone number, at block 642. The method then terminates at 644.

Returning to decision step 628, if a call log is not requested at the communication device, the method can move to decision step 634, and it can be determined whether a network address book (NAB) associated with the communication device is requested at the communication device. If the NAB is not requested, the method terminates at 644. Alternatively, if the NAB is requested, the method proceeds to block 636. At block 636, a prompt to submit a NAB section or collection of contacts can be received at the communication device. The NAB section or contact collection can be selected by the caller at the communication device using voice commands, dual tone multiplex frequency signals issued via touch tone keys, a stylus, or other keys at the communication device. Continuing to block 638, audio related to a selected portion of the NAB is received at the communication device. In a particular embodiment, graphical or textual content can be received at the communication device, for example, if the communication device is a personal data assistant (PDA), laptop, or other device capable of receiving graphical or textual data. The method then proceeds to decision step 640 and continues. The method terminates at 644

Though the aspects of the disclosed methods have been presented in a certain order, for ease of description, certain portions of the method may be performed in a different order or simultaneously.

In conjunction with the configuration of structure described herein, the system and method disclosed provide an intelligent service switching system used to provide a variety of Internet Protocol (IP) based multimedia communication services over an integrated wireline and wireless (IWW) network. In a particular embodiment, the ISS system uses the context of a service request (i.e., access device, network, time, location, past history/usage patterns associated with this user, etc) to intelligently customize a variety of IP-based multimedia communication services offered to the user. Customization may include a selection of one or more appropriate services, as well as personalization of the selected service (s), both based on associated context information.

Figure 7:
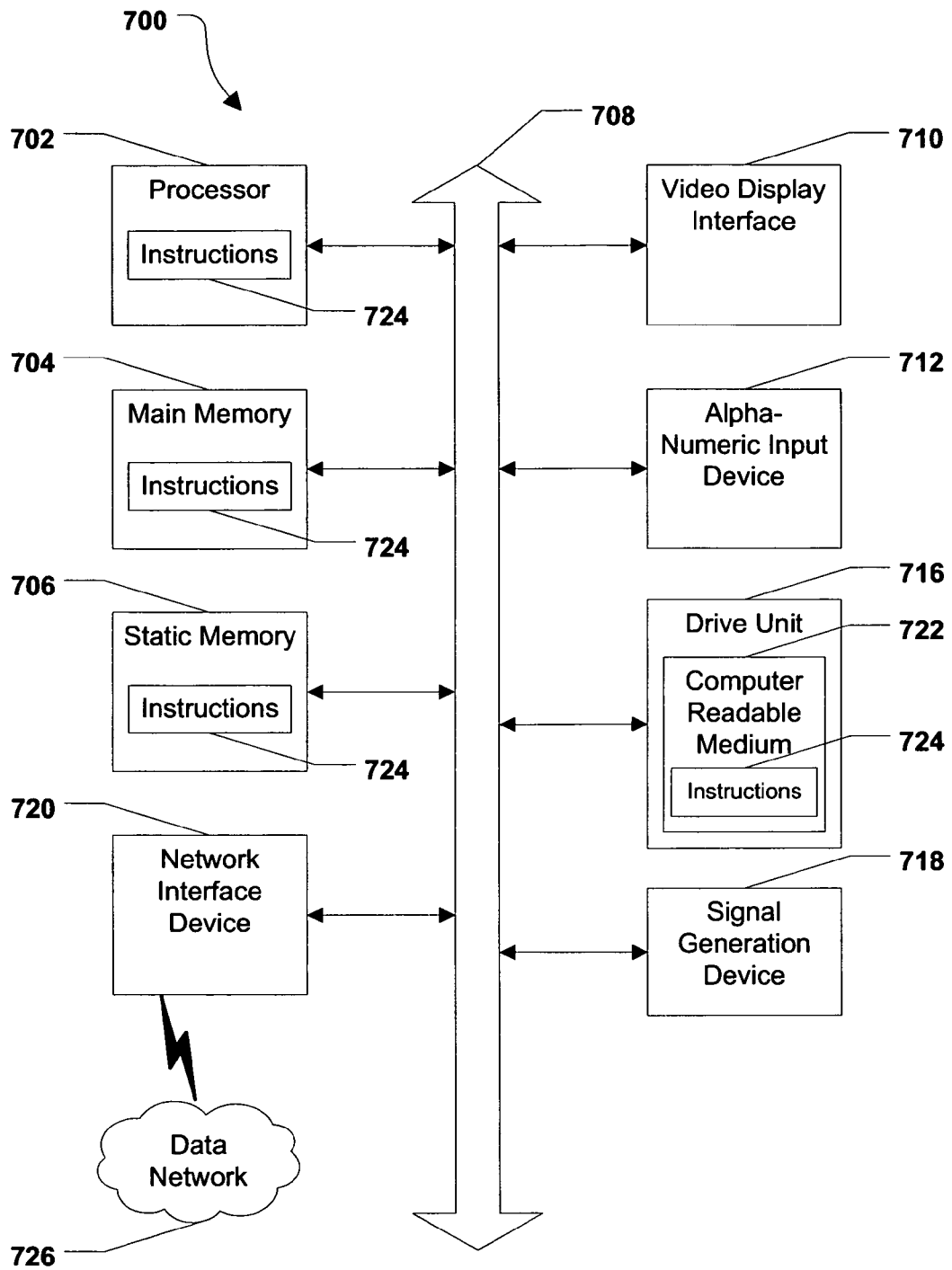
FIG. 7 is a diagram of an illustrative embodiment of a general computer system.

Referring to FIG. 7, an illustrative embodiment of a general computer system is shown and is designated 700. The computer system 700 can include a set of instructions that can be executed to cause the computer system 700, or a portion thereof, to perform any one or more of the methods or computer based functions disclosed herein. The computer system 700, or any portion thereof, may operate as a standalone device or may be a hardware or software module within a communication server, a network edge device, a network router, an intelligent service switch, or an analog telephone adapter, as illustrated in FIGS. 1-3.

The computer system 700 can also be implemented as or incorporated into various other devices, such as the communication devices and customer premises equipment (CPE) illustrated in FIGS. 1-3, or any other machine capable of executing a set of instructions (sequential or otherwise) that specify actions to be taken by that machine. In a particular embodiment, the computer system 700 can be implemented using electronic devices that provide audio, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a remote control input, an input control panel, a keyboard, a mouse, a gaming station input, or one or more keys disposed on a set-top box device. The computer system 700 can also include a disk drive unit 716, a signal generation device 718, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives instructions 724 responsive to a propagated signal, so that a device connected to a network 726 can communicate audio, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing multimedia communication services, the method comprising:
    receiving contextual information including a subscriber identification associated with a communication device at an intelligent service switch (ISS) of an integrated wireline-wireless (IWW) network from a network edge device, wherein the network edge device has detected a service request at the communication device, wherein the contextual information includes a time of the service request, a range of times of the service request, a day of the service request, a range of days of the service request, a date of the service request, a range of dates of the service request, a location of the communication device, a type of communication device, or any combination thereof;
    determining, at the ISS, at least one multimedia communication service based on the contextual information and based on at least one service filter associated with the subscriber identification, wherein the at least one service filter includes a terminating filter and an origination filter, wherein the origination filter is configured to relate a code to the at least one multimedia communication service, and wherein the contextual information includes the code;
    receiving a destination telephone number from the communication device; and
    providing a caller-specific ring tone at a destination device associated with the destination telephone number based on the terminating filter, wherein the terminating filter selects the caller-specific ring tone based on a caller associated with the communication device;
    wherein the at least one multimedia communication service includes a voice information system that prompts the caller associated with the communication device to submit a voice information service request; and
    wherein the voice information system provides audio entertainment content, news content, weather content, traffic content, securities market content, sports content, financial content, local business location content, local event schedule content, network address book content, calendar content, appointment content, map content, call log content, or any combination thereof, in response to the voice information service request.

2. The method of claim 1, wherein the code is dialed at the communication device, spoken at the communication device, or any combination thereof.

3. The method of claim 1, wherein the origination filter relates at least a portion of the contextual information to the at least one multimedia communication service.

4. The method of claim 1, wherein the voice information system is coupled to a speech audio services platform and the voice information service request includes a spoken request.

5. The method of claim 4, wherein the voice information service request includes a request to review contact information of at least one network address book associated with the subscriber identification.

6. The method of claim 5, further comprising connecting the communication device with the destination device, wherein the destination device is associated with a contact in the at least one network address book, wherein the voice information system receives a command from the communication device to connect with a telephone number of the contact.

7. The method of claim 5, wherein the voice information service request includes a request to review contact information of at least one network call log associated with the subscriber identification.

8. The method of claim 7, further comprising connecting the communication device with a device associated with a contact in the at least one network call log, wherein the voice information system receives a command from the communication device to connect with a telephone number of the contact.

9. The method of claim 4, wherein the intelligent service switch connects the communication device with the voice information system when no origination filter is associated with the communication device.

10. The method of claim 1, wherein the voice information system prompts the caller associated with the communication device to submit the destination telephone number by producing a continuous dial tone, reducing a dial tone, interrupting a dial tone, providing a voice-dial prompt, producing a verbal prompt, or any combination thereof.

11. The method of claim 1, wherein the service request includes an off-hook indication of the communication device.

12. The method of claim 1, further comprising:
routing content of the at least one multimedia communication service to the communication device.

13. A method of providing multimedia communication services, the method comprising:
detecting a service request of a communication device;
determining contextual information related to the service request, wherein the contextual information includes a subscriber identification associated with the communication device, and includes a time of the service request, a range of times of the service request, a day of the service request, a range of days of the service request, a date of the service request, a range of dates of the service request, a location of the communication device, a type of communication device, or any combination thereof;
transmitting the contextual information to an intelligent service switch, wherein the intelligent service switch determines at least one multimedia communication service based on the contextual information and based on at least one service filter associated with the subscriber identification, wherein the at least one service filter includes a terminating filter and an origination filter, wherein the origination filter is configured to relate a code to the at least one multimedia communication service, wherein the contextual information includes the code, and wherein the at least one multimedia communication service includes a voice information system that prompts a caller associated with the communication device to submit a voice information service request; and
transmitting a destination telephone number to the intelligent service switch, wherein the intelligent service switch provides a caller-specific ring tone at a destination device associated with the destination telephone number based on the terminating filter, wherein the terminating filter selects the caller-specific ring tone based on the caller associated with the communication device;
wherein the voice information system provides audio entertainment content, news content, weather content, traffic content, securities market content, sports content, financial content, local business location content, local event schedule content, network address book content, calendar content, appointment content, map content, call log content, or any combination thereof, in response to the voice information service request.

14. The method of claim 13, further comprising obtaining at least a portion of the contextual information from caller identification information associated with the communication device.

15. The method of claim 13, further comprising:
receiving content of the at least one multimedia communication service via the intelligent service switch; and
transmitting the content to the communication device.

16. A system to provide multimedia communication services, the system comprising:
an intelligent service switch configured to:
receive contextual information related to a communication device from a network edge device of an integrated wireline-wireless (IWW) network, wherein the network edge device includes an interface to detect a service request at the communication device;
wherein the contextual information includes a subscriber identification associated with the communication device and includes a time of the service request, a range of times of the service request, a day of the service request, a range of days of the service request, a date of the service request, a range of dates of the service request, a location of the communication device, a type of communication device, or any combination thereof;
wherein the intelligent service switch includes at least one service filter associated with the subscriber identification and is configured to:
determine at least one multimedia communication service based on the contextual information and based on the at least one service filter, wherein the at least one service filter includes a terminating filter and an origination filter, wherein the origination filter is configured to relate a code to the at least one multimedia communication service, and wherein the contextual information includes the code;
receive a destination telephone number from the network edge device, wherein the network edge device receives the destination telephone number from the communication device; and
provide a caller-specific ring tone at a destination device associated with the destination telephone number based on the terminating filter, wherein the terminating filter selects the caller-specific ring tone based on a caller associated with the communication device
wherein the at least one multimedia communication service includes a voice information system that prompts the caller associated with the communication device to submit a voice information service request; and
wherein the voice information system provides audio entertainment content, news content, weather content, traffic content, securities market content, sports content, financial content, local business location content, local event schedule content, network address book content, calendar content, appointment content, map content, call log content, or any combination thereof, in response to the voice information service request.

17. The system of claim 16, wherein the intelligent service switch is configured to access at least one service filter table associated with the at least one service filter and wherein the at least one service filter table includes at least one service filter value associated with the subscriber identification.

18. The system of claim 17, wherein the at least one service filter table is stored in an external data store coupled to the intelligent service switch.

19. The system of claim 16, wherein the communication device is a plain old telephone service (POTS) telephone that communicates with the intelligent service switch via an adaptor device that receives signals from the POTS telephone and converts the signals to commands suited for communication to the IWW network.

20. The system of claim 16, wherein the communication device is a plain old telephone system (POTS) communication device.

21. The system of claim 20, wherein the intelligent switch service (ISS) is configured to determine that the POTS communication device is associated with an audio entertainment service, and wherein the intelligent switch service (ISS) is configured to connect the POTS communication device with the audio entertainment service.

22. The system of claim 16, wherein the at least one filter further includes a calendar filter, wherein the calendar filter is configured to enable or disable services to be provided to the communication device based on a calendar date of the service request.

23. A system to provide multimedia communication services, the system comprising:
  a network edge device of an integrated wireline-wireless (IWW) network, the network edge device configured to:
    detect a service request from a communication device coupled to the IWW network;
    determine contextual information related to the communication device, wherein the contextual information includes a subscriber identification associated with the communication device and includes a time of the service request, a range of times of the service request, a day of the service request, a range of days of the service request, a date of the service request, a range of dates of the service request, a location of the communication device, a type of communication device, or any combination thereof;
    receive a destination telephone number from the communication device; and
    transmit the contextual information and the destination telephone number to an intelligent service switch, the intelligent service switch determining at least one multimedia communication service based on the contextual information and based on at least one service filter associated with the subscriber identification, wherein the at least one service filter includes a terminating filter and an origination filter, wherein the origination filter is configured to relate a code to the at least one multimedia communication service, and wherein the contextual information includes the code;
  wherein the intelligent service switch provides a caller-specific ring tone at a destination device associated with the destination telephone number based on the terminating filter, wherein the terminating filter selects the caller-specific ring tone based on a caller associated with the communication device;
  wherein the at least one multimedia communication service includes a voice information system that prompts the caller associated with the communication device to submit a voice information service request; and
  wherein the voice information system provides audio entertainment content, news content, weather content, traffic content, securities market content, sports content, financial content, local business location content, local event schedule content, network address book content, calendar content, appointment content, map content, call log content, or any combination thereof, in response to the voice information service request.

24. The system of claim 23, wherein the network edge device includes a data store and is configured to retrieve the subscriber identification from the data store.

25. The system of claim 23, wherein the network edge device is coupled to an external data store and is configured to retrieve the subscriber identification from the external data store.

26. A non-transitory computer-readable medium, comprising:
  instructions executable by a processor to cause the processor to detect a service request from a communication device coupled to an integrated wireline-wireless (IWW) network;
  instructions executable by the processor to cause the processor to determine contextual information related to the communication device, wherein the contextual information includes a subscriber identification associated with the communication device and a type of the communication device, and includes a time of the service request, a range of times of the service request, a day of the service request, a range of days of the service request, a date of the service request, a range of dates of the service request, a location of the communication device, a type of communication device, or any combination thereof;
  instructions executable by the processor to cause the processor to receive a destination telephone number from the communication device; and
  instructions executable by the processor to cause the processor to transmit the contextual information and the destination telephone number to an intelligent service switch, the intelligent service switch determining at least one multimedia communication service based on the contextual information and based on at least one service filter associated with the subscriber identification, wherein the at least one service filter includes a terminating filter and an origination filter, wherein the origination filter is configured to relate a code to the at least one multimedia communication service, and wherein the contextual information includes the code;
  wherein the intelligent service switch provides a caller-specific ring tone at a destination device associated with the destination telephone number based on the terminating filter, wherein the terminating filter selects the caller-specific ring tone based on a caller associated with the communication device;
  wherein the at least one multimedia communication service includes a voice information system that prompts the caller associated with the communication device to submit a voice information service request; and
  wherein the voice information system provides audio entertainment content, news content, weather content, traffic content, securities market content, sports content, financial content, local business location content, local event schedule content, network address book content, calendar content, appointment content, map content, call log content, or any combination thereof, in response to the voice information service request.

27. The computer program of claim 26, wherein the communication device is a wireline or wireless device.

28. A non-transitory computer-readable medium, comprising:
  instructions executable by a processor to cause the processor to communicate with a network edge device of an integrated wireline-wireless (IWW) network to receive contextual information related to a communication device, wherein the network edge device has detected a service request at the communication device;
  wherein the contextual information includes a subscriber identification associated with the communication device and a type of the communication device and includes a time of the service request, a range of times of the service request, a day of the service request, a range of days of the service request, a date of the service request, a range of dates of the service request, a location of the communication device, a type of communication device, or any combination thereof;
  instructions executable by the processor to cause the processor to communicate with the network edge device to receive a destination telephone number, wherein the network edge device receives the destination telephone number from the communication device;
  instructions executable by the processor to cause the processor to determine at least one service filter based on the subscriber identification;

instructions executable by the processor to cause the processor to determine at least one multimedia communication service based on the contextual information and based on the at least one service filter, wherein the at least one service filter includes a terminating filter and an origination filter, wherein the origination filter is configured to relate a code to the at least one multimedia communication service, and wherein the contextual information includes the code; and instructions executable by the processor to cause the processor to provide a caller-specific ring tone at a destination device associated with the destination telephone number based on the terminating filter, wherein the terminating filter selects the caller-specific ring tone based on a caller associated with the communication device;

wherein the at least one multimedia communication service includes a voice information system that prompts the caller associated with the communication device to submit a voice information service request; and wherein the voice information system provides audio entertainment content, news content, weather content, traffic content, securities market content, sports content, financial content, local business location content, local event schedule content, network address book content, calendar content, appointment content, map content, call log content, or any combination thereof, in response to the voice information service request.

29. The computer program of claim 28, wherein the at least one service filter includes at least one service filter table, and wherein a plurality of service filter values within the at least one service filter table are selectable by a user at a web interface.

30. The computer program of claim 29, wherein the plurality of service filter values include the subscriber identification, the destination telephone number, a service code, a mid-call service request, a type of communication device, a calendar date, a day of a week, a time of a day, a location of the communication device, or any combination thereof.

* * * * *